United States Patent [19]

Domes

[11] Patent Number: 5,059,038
[45] Date of Patent: Oct. 22, 1991

[54] AERODYNAMIC PLAIN BEARING

[75] Inventor: Bernd Domes, Wehrheim, Fed. Rep. of Germany

[73] Assignee: BMW Rolls-Royce GmbH, Fed. Rep. of Germany

[21] Appl. No.: 546,294

[22] Filed: Jun. 29, 1990

[51] Int. Cl.$^5$ ............................................. F16C 17/02
[52] U.S. Cl. .................................... 384/104; 384/103; 384/913; 384/907.1
[58] Field of Search ...................... 384/104, 103, 907.1, 384/105, 913

[56] References Cited

U.S. PATENT DOCUMENTS 3,215,480  11/1965  Marley ................................ 384/104
3,615,121  10/1971  Barnett et al. ....................... 384/103

Primary Examiner—Lenard A. Footland
Attorney, Agent, or Firm—Evenson, Wands, Edwards, Lenahan & McKeown

[57] ABSTRACT

The invention concerns an aerodynamic plain bearing for shafts (1) rotating at high speeds, with a bearing housing (4) having a cylindrical bore (3) and with a tangentially attached, elastic and damping structure (2) having segments (2" or 2a), which is supported at a plurality of circumferential points (2') in bearing housing (4) and forms a multiple converging running gap (6) with shaft (1) and damping gap (5) with bearing housing (4). A minimum number of components are used and radial installation space is also minimized. Segments (2" or 2a) of the structure are thin-walled, elastic sleeve sections with a uniform or profiled wall thickness and a low coefficient of friction, as from titanium nitrite, and simultaneously act as damping and spring elements.

7 Claims, 1 Drawing Sheet

AERODYNAMIC PLAIN BEARING

TECHNICAL FIELD

This invention relates to an aerodynamic plain bearing having an elastic sleeve means supporting and damping a shaft.

PRIOR ART STATEMENT

A plain bearing of the kind hereinbefore mentioned is disclosed in Federal Republic of Germany patent DE-OS 35 44 392, wherein a shaft is mounted on substructures, which have defined spring stiffness values and damping capabilities, distributed around circumference. Located between each of the substructures and the bearing housing is a damping gap, which gives the plain bearing a certain damping characteristic. Each of the substructures consists of a sliding segment and a spring element, which are located radially behind one another, with the rigid sliding segment possibly being supported by an external extension on the spring element. This configuration necessitates a relatively large number of parts, which moreover require a correspondingly large radial installation space and results in relatively large total tolerances.

Federal Republic of Germany patent DE-PS 29 09 973, also discloses an aerodynamic plain bearing, having two thin-walled elastic sleeves one inside the other, the inner one of which serves as the bearing shell and is supported by the outer sleeve by means of webs. The outer sleeve, which provides elastic and damping support for the inner sleeve, is in turn supported by means of webs on the inner wall of the housing bore. The original circular cross section of the inner sleeve is deformed, because of the fact that the elastic and damping structure is clamped in the housing bore, in such a way that four wedge-shaped constrictions are created in the running gap on the circumference of the bearing. This design is also complex, requires more radial installation space, and leads to relatively large total tolerances.

OBJECTS AND SUMMARY OF THE INVENTION

It is a primary object of the invention to create an aerodynamic plain bearing employing elastic support and damping sleeve means which minimizes the number of components and requires a minimum of radial installation space.

The number of components is considerably reduced by the fact that the damping and spring element are combined into one, as a result of which the radial installation space is significantly decreased. At the same time, this results in lower total tolerances. This design also has considerable advantages in terms of production, costs and function, especially when a one-piece spring sleeve made of spring steel is used as the combined damping and spring element.

BRIEF DESCRIPTION OF THE DRAWINGS

The invention will be described below in more detail, with reference to the exemplary embodiments illustrated in the attached drawings in which.

DETAILED DESCRIPTION OF THE DRAWINGS

Figure 1:
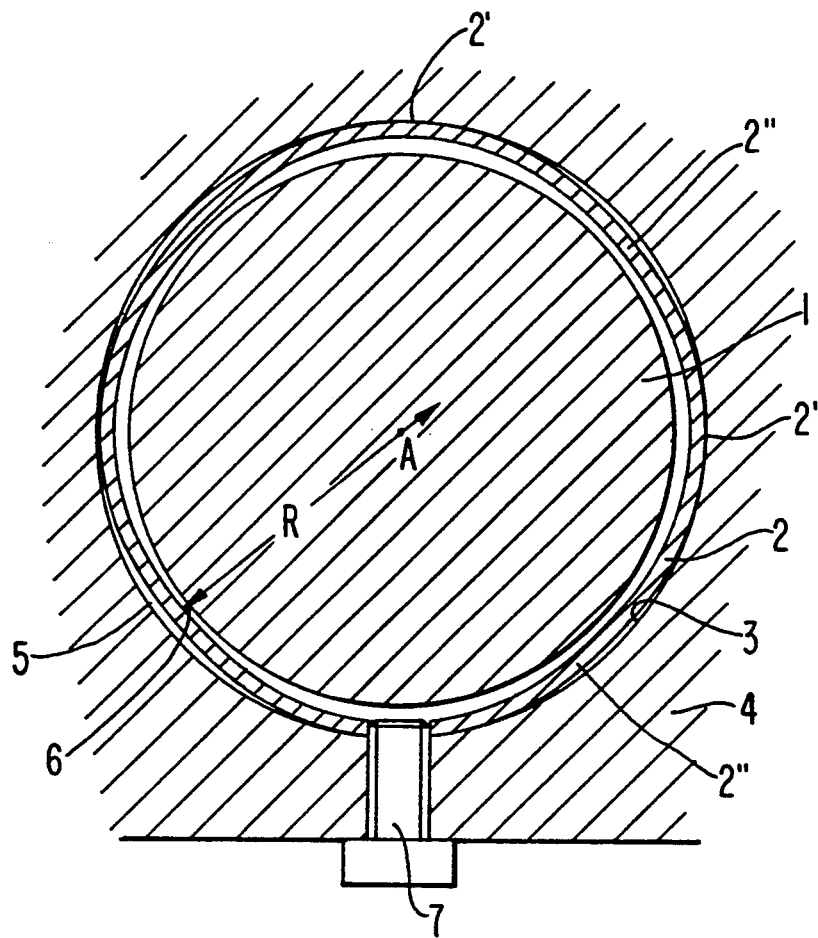
FIG. 1 shows a section through an aerodynamic radial bearing in a first embodiment and FIG. 2 shows a portion of a section through an aerodynamic radial bearing in a second embodiment.

In the embodiment of an aerodynamic radial bearing illustrated in FIG. 1, a shaft 1 is mounted by means of a thin-walled elastic spring sleeve 2, which has a uniform or profiled wall thickness, in a cylindrical bore 3 of a bearing housing 4.

The spring sleeve 2 is made of resilient spring steel, and is slightly noncircular in section so that at several (at least three, and as illustrated four) support points 2' on the outer circumference it touches the wall of bore 3 and thus has a somewhat "polygonal" shape so that sickle-shaped damping gaps 5 are formed between the wall of bore 3 and those spring segments 2" of spring sleeve 2 which are located between each two adjacent support points 2' and have a radius of curvature R greater than the radius of bore 3, with the center point lying outside axis A of shaft 1. Located between the inner circumference of spring sleeve 2 and shaft 1 is a running gap 6 which, corresponding to the "polygonal" shape of spring sleeve 2, is noncircular, i.e. has wedge-shaped constrictions.

Spring sleeve 2 engages a tangential attachment 7 at one of its support points 2' in the form of a screw accommodated by bearing housing 3, the free end of which extends into a corresponding opening or recess in spring sleeve 2. Instead of a screw, a pin or the like can also be used.

A spring sleeve 2 of this type can easily be produced from a section of a spring steel tube that is pressed with a suitable tool into the "polygonal" shape. It may also possibly be cut to length from a suitably shaped or profiled tube. It is important to maintain a certain uniform wall thickness or a precisely defined thickness distribution, so that the damping gap 5 and running gap 6 can be precisely defined to correspond to the shaft and bearing diameter. A profiled spring sleeve 2 or corresponding individual segment 2a can also be manufactured by electrical discharge machining.

Figure 2:
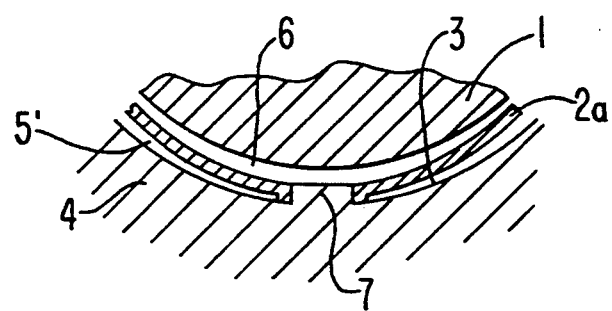

As indicated by the embodiment in FIG. 2, a plurality of tangential abutments or attachments 7 can also be provided on the bearing housing. These can be provided at all the support points 2' at which the spring sleeve 2 contacts the wall of bore 3.

It is also possible to use, instead of the spring sleeve 2, corresponding separate spring segments 2a in a number corresponding to the number of support points 2' (four, in the case illustrated), which are then supported at abutment or tangential attachments 7. In this case tangential attachments 7 can be configured as axial ribs projecting into bore 3. The individual spring segments 2a can, adjacent to the tangential attachments, be bent slightly towards the outer circumference, or have a suitable profile.

Spring sleeve 2 or separate spring segments 2a are advantageously provided with a suitable coating, which is elastic and which gives spring sleeve 2 or separate spring segments 2a a low coefficient of friction. Suitable coatings include diamond-like carbon, which can also be applied to shaft 1, titanium nitrite, or another hard, wear-resistant, low-friction coating. In the case of a shaft 1 made of hard material or having a hard, wear-resistant coating, a relatively soft coating on spring sleeve 2 or spring segments 2a is also a possibility. This could compensate for small dust or dirt particles without appreciably restricting the function. A hard coating on spring sleeve 2 or spring segments 2a and a soft coated shaft 1 is also possible.

Spring sleeve 2 or individual spring segments 2a can also be made of artificial carbon and acquire the necessary flexibility needed over the long term when the damping gap width deflects, by means of fiber reinforcements (CFC).

The embodiment of the invention in which an exclusive property or privilege is claimed are defined as follows:

1. An aerodynamic plain bearing for a shaft (1) rotating at a high rotation speed, with a bearing housing (4) having a cylindrical bore (3) and with a tangentially attached elastic damping structure (2) said damping structure (2), comprising a single piece, thin-walled, resilient sleeve of polygonal section with a substantially uniform wall thickness and a low coefficient of friction, which simultaneously acts as a damping element and as a spring element, said resilient sleeve being supported at a plurality of circumferentially spaced points (2') in said bore (3) of said bearing housing (4) thereby forming a plurality of running gaps (6) with said shaft (1) and a plurality of damping gaps (5) with the bore (3) of said bearing housing (4).

2. The plain bearing of claim 1 wherein said sleeve is made of spring steel.

3. The plain bearing of claim 2, wherein said segments have a coating of low-friction, wear-resistant material.

4. The plain bearing of claim 2 wherein said bearing housing (4) has a tangential attachment (7) and said spring steel sleeve (2) has a recess which engages with said tangential attachment (7).

5. The plain bearing of claim 2 wherein said spring steel sleeve (2) is produced by cutting to length from a tube, with subsection forming, to produce the shape that is polygonal in section.

6. The plain bearing of claim 2 wherein said spring steel sleeve (2) has segments (2" or 2a) that are profiled in section, which form a plurality of converging running gaps (6) together with shaft (1) and sickle-shaped damping gaps (5) when combined with housing (4).

7. The plain bearing of claim 1 wherein said polygonal section resilient sleeve is made of fiber-reinforced artificial carbon.

* * * * *

UNITED STATES PATENT AND TRADEMARK OFFICE
CERTIFICATE OF CORRECTION

PATENT NO.   : 5,059,038
DATED        : October 22, 1991
INVENTOR(S)  : Bernd Domes It is certified that error appears in the above-identified patent and that said Letters Patent is hereby corrected as shown below:

On the title page, insert the following:

--[30] Foreign Application Priority Data
    July 1, 1989 [DE] Fed. Rep. of Germany ......3921704--.

Signed and Sealed this

Sixteenth Day of March, 1993

Attest:

STEPHEN G. KUNIN

*Attesting Officer*    Acting Commissioner of Patents and Trademarks